US010959081B2

(12) United States Patent
Chapados

(10) Patent No.: US 10,959,081 B2
(45) Date of Patent: Mar. 23, 2021

(54) NETWORK-BASED ALERT SYSTEM AND METHOD

(71) Applicant: Carmen Chapados, Edmonton (CA)

(72) Inventor: Carmen Chapados, Edmonton (CA)

( * ) Notice: Subject to any disclaimer, the term of this patent is extended or adjusted under 35 U.S.C. 154(b) by 0 days.

(21) Appl. No.: 16/797,272

(22) Filed: Feb. 21, 2020

(65) Prior Publication Data

US 2020/0196129 A1    Jun. 18, 2020

Related U.S. Application Data

(63) Continuation of application No. 16/710,168, filed on Dec. 11, 2019.

(60) Provisional application No. 62/778,322, filed on Dec. 12, 2018.

(51) Int. Cl.
*H04W 4/90* (2018.01)
*H04W 4/06* (2009.01)

(52) U.S. Cl.
CPC ............ *H04W 4/90* (2018.02); *H04W 4/06* (2013.01)

(58) Field of Classification Search
CPC .................................. H04W 4/90; H04W 4/06
USPC ............................................. 455/3.01, 404.1
See application file for complete search history.

(56) References Cited

U.S. PATENT DOCUMENTS

| 5,143,078 | A  | * | 9/1992  | Mather  | A61B 5/0816 |
|           |    |   |         |         | 600/484     |
| 8,538,374 | B1 | * | 9/2013  | Haimo   | G01S 5/0027 |
|           |    |   |         |         | 455/404.2   |
| 8,866,606 | B1 | * | 10/2014 | Will    | G08B 25/016 |
|           |    |   |         |         | 340/539.11  |
| 9,232,040 | B2 | * | 1/2016  | Barash  | G08B 21/0211|
| 9,622,048 | B2 | * | 4/2017  | Seo     | G08G 1/0133 |
| 10,375,187| B1 | * | 8/2019  | Marlin  | H04L 67/22  |

(Continued)

OTHER PUBLICATIONS

Mobile Software AS, BSafe—never walk alone, online: <https://getbsafe.com/> (accessed on Mar. 11, 2020), 2020, 12 pages, Norway.

(Continued)

*Primary Examiner* — Hai V Nguyen
(74) *Attorney, Agent, or Firm* — Davis & Bujold PLLC; Michael J. Bujold

(57) ABSTRACT

Described is an alert system and method a system and method for alerting nearby network-connected communication devices. The system includes a network-connected victim communication device configured to receive a trigger, and at least one network-connected target communication device configured to receive and provide notification of an alert. The alert management server is communicatively coupled to the network-connected victim communication device and to the at least one network-connected target communication device to receive the trigger from the network-connected victim communication device and to provide the alert to the at least one network-connected target communication device. The alert management server is configured to monitor the network-connected victim communication device for the trigger, receive the trigger from the network-connected victim communication device, create an alert based on the trigger, and send the alert to the at least one network-connected target communication device. A related method of distributing an alert is also described.

6 Claims, 5 Drawing Sheets

(56) References Cited

U.S. PATENT DOCUMENTS

| | | | | |
|---|---|---|---|---|
| 10,565,845 B1* | 2/2020 | Beyer | | G08B 25/005 |
| 10,580,280 B1* | 3/2020 | Picco | | G08B 25/14 |
| 10,621,846 B1* | 4/2020 | Beyer | | G08B 21/02 |
| 10,665,078 B1* | 5/2020 | Picco | | G08B 21/02 |
| 10,861,310 B2* | 12/2020 | Picco | | G08B 25/006 |
| 2006/0208946 A1* | 9/2006 | Bailey | | G01S 19/11 |
| | | | | 342/386 |
| 2008/0070546 A1* | 3/2008 | Lee | | H04L 12/1845 |
| | | | | 455/404.2 |
| 2010/0136945 A1* | 6/2010 | Givens | | G06Q 10/04 |
| | | | | 455/404.2 |
| 2010/0291894 A1* | 11/2010 | Pipes | | H04W 4/02 |
| | | | | 455/404.2 |
| 2011/0130112 A1* | 6/2011 | Saigh | | H04M 1/7253 |
| | | | | 455/404.1 |
| 2011/0313770 A1* | 12/2011 | Pottle | | G08B 27/006 |
| | | | | 704/258 |
| 2013/0157624 A1* | 6/2013 | Talwar | | H04W 4/18 |
| | | | | 455/412.1 |
| 2013/0217332 A1* | 8/2013 | Altman | | H04W 12/04 |
| | | | | 455/41.2 |
| 2014/0344446 A1* | 11/2014 | Rjeili | | H04L 41/0803 |
| | | | | 709/224 |
| 2014/0365390 A1* | 12/2014 | Braun | | H04W 4/023 |
| | | | | 705/325 |
| 2015/0042470 A1* | 2/2015 | Muetzel | | G08B 29/181 |
| | | | | 340/539.12 |
| 2016/0050037 A1* | 2/2016 | Webb | | G08B 27/005 |
| | | | | 455/3.01 |
| 2017/0086050 A1* | 3/2017 | Kerning | | H04W 4/026 |
| 2019/0197864 A1* | 6/2019 | Hui | | G08B 21/0277 |
| 2019/0230170 A1* | 7/2019 | Marlin | | G06F 40/242 |
| 2019/0230467 A1* | 7/2019 | Williams | | G01C 21/3697 |
| 2019/0236734 A1* | 8/2019 | Pinotti | | H04W 4/021 |
| 2020/0090483 A1* | 3/2020 | Picco | | G08B 25/006 |
| 2020/0092700 A1* | 3/2020 | Picco | | G08B 25/08 |
| 2020/0196128 A1* | 6/2020 | Chapados | | H04W 4/06 |

OTHER PUBLICATIONS

Parachute Labs Inc., The Parachute App, online: <https://parachute.live/app> (accessed on Mar. 11, 2020), 2020, 9 pages, New York.

* cited by examiner

NETWORK-BASED ALERT SYSTEM AND METHOD

FIELD OF THE INVENTION

The present specification relates generally to an alert system and method, and specifically to a system and method for alerting nearby networked devices.

BACKGROUND OF THE INVENTION

Many people are in need of assistance from time to time. Protection from physical violence, medical assistance, psychological assistance, and various types of care assistance may be needed from time to time.

Often, when a person finds themselves in need of assistance, they phone a friend, a neighbour, or an emergency service. However, in some circumstances the friend, neighbour, or emergency service may not be available or may not be available in time. Further, in some circumstances, a person may not wish to place a call or may not be able to place a call.

Accordingly, there remains a need for improvements in the art.

SUMMARY OF THE INVENTION

In an embodiment of the present invention, there is provided a system for propagating an alert, comprising: a network-connected victim communication device comprising a processor, a memory, an input device and a transmitter configured to receive a trigger from a victim user; at least one network-connected target communication device comprising a processor, a memory and a receiver configured to receive an alert and to provide a notification of the alert to a target user; and an alert management server communicatively coupled over a network to the network-connected victim communication device and to the at least one network-connected target communication device and configured to receive the trigger from the network-connected victim communication device and to provide the alert to the at least one network-connected target communication device, the alert management server configured to monitor the network-connected victim communication device for the trigger, receive the trigger from the network-connected victim communication device, create an alert based on the trigger, and send the alert to the at least one network-connected target communication device.

In an embodiment of the present invention, there is provided a method of distributing an alert, comprising: receiving a trigger from a network-connected victim communication device; accessing a network-connected victim communication device location; creating an alert from the trigger and the network-connected victim communication device location; and communicating an alert to at least one network-connected target communication device.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which.

DETAILED DESCRIPTION OF THE EMBODIMENTS

Figure 1:
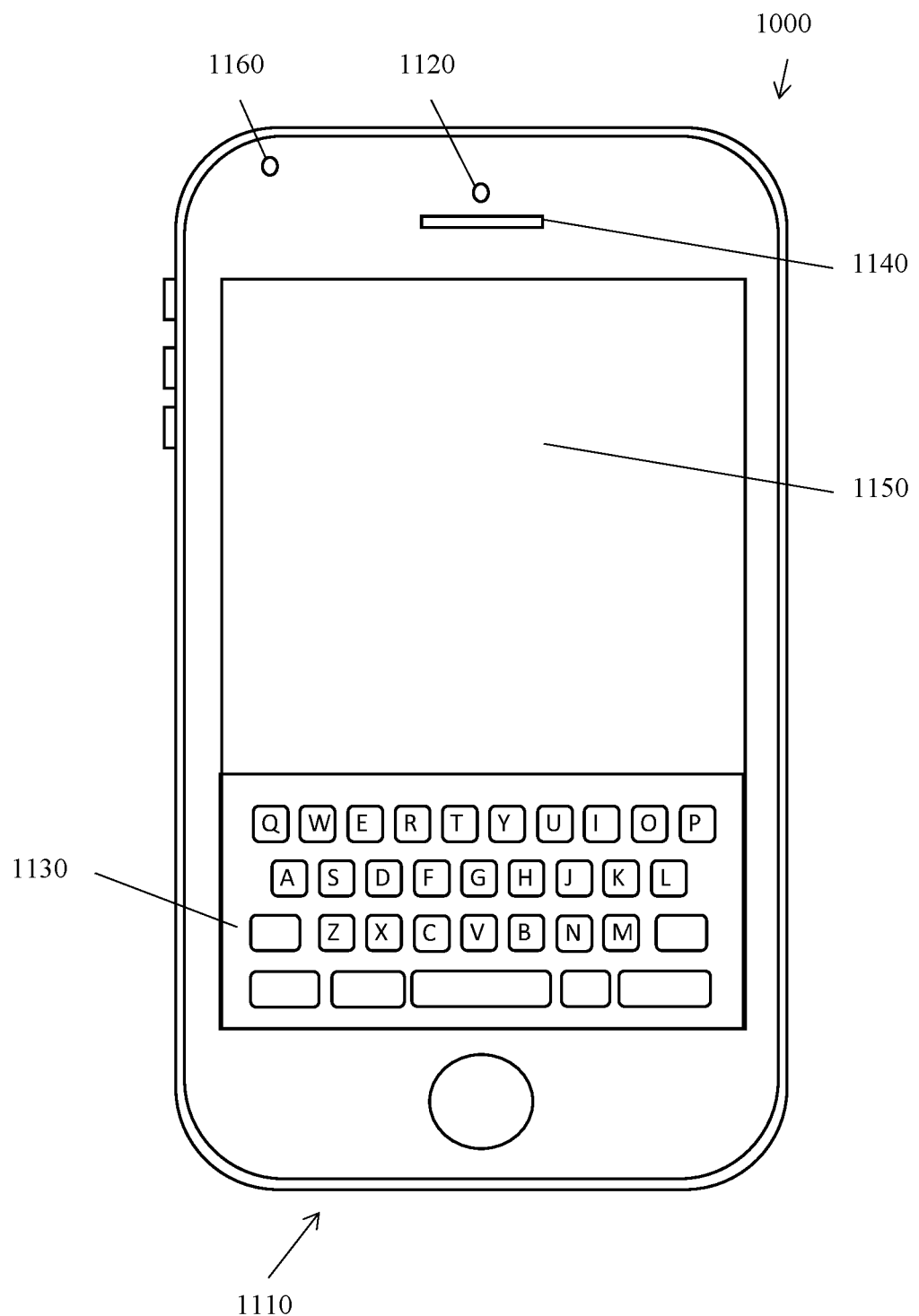
FIG. 1 is a cellphone, for use with an embodiment.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

An aspect of this description relates to a system implementing a software application to allow a user to access the software application on a mobile device to request help by voice or by touch. An aspect of this description relates to a system implementing a software application which records a message, a video, or a message and a video in real time. An aspect of this description relates to a system implementing a software application which sends a message, a video, or a message and a video to nearby communication devices which are running a similar software application.

An aspect of this description relates to a system implementing a software application which sends an alert from an anchor device to nearby assistance devices when a trigger is received by the anchor device. In some embodiments, only nearby communication devices which have recorded a willingness to render assistance will get receive an alert when an alert is sent from an anchor device. In some embodiments, nearby devices will receive a location of an anchor device to facilitate assistance. In some embodiments, note is made of nearby devices which have received a location of an anchor device, such as to protect a user of the anchor device at least by providing a degree of accountability. In some embodiments, note is made of which nearby devices answered the alert.

An aspect of this description relates to a system implementing a software application which allows an anchor device to easily trigger an alert. In some embodiments, an anchor device will automatically begin recording video, audio, or both video and audio once a trigger is received. In some embodiments, a location, such as a Global Positioning System ("GPS") based location, is sent when the anchor device implementing an alert software application receives a trigger. In some embodiments, location, video, audio, or some combination is sent continuously once a trigger is received. In some embodiments, location, video, audio, or some combination is sent in bursts or periodically once a trigger is received. In some embodiments, alerts last until service is rendered.

An aspect of this description relates to a system implementing a software application which uses editors, machine learning, predefined conditions, or some combination to distinguish between types of emergencies. In some embodiments, an application can review audio, video, text or other input to determine a type of emergency. In some embodiments, an application sends an alert to nearby users for a first class of emergency, sends an alert to nearby emergency services for a second class of emergency, and sends an alert to both nearby users and nearby emergency services for a third class of emergency.

An aspect of this description relates to a system implementing a software application which can receive one or more of a variety of trigger types. In some embodiments, an application presents a user with the option of selecting a recipient of an alert. In some embodiments, an application has a default recipient set, but a user can change the default, or override the default. In some embodiments, an application can receive as a trigger an audible statement, such as the phrase "I need a hero" or "hero app", which allows for hands free activation of a trigger. In some embodiments, the ability to trigger by an audible statement may be embedded in firmware of an operating system of a mobile device.

Examples of reasons for a trigger include a user stuck in a wheelchair, a robbery, elder home abuse, child sexual physical abuse, and kidnapping.

FIG. 1 depicts a smartphone 1000 for use in an embodiment. Smartphone 1000 includes at least one input device to receive input from a user, such as a microphone 1110, a camera 1120, or a keypad 1130, and has the capabilities to run software applications and communicate over local and wide area networks, including the Internet.

Smartphone 1000 is configured to make a software application available to the user, such as a locally downloaded software application or a web-based software application. The software application made available through smartphone 1000 allows the user to provide a trigger through an input. When the software application receives the trigger, it sends out an alert to all nearby users of the same software application or one or more related software applications. For example, users of a software application may be asked to provide the software application access to one or more output, such as a speaker 1140, a display 1150, or a light 1160. When an alert is received by nearby users of the same software application or one or more related software applications, one or more outputs provides an indicator of the alert.

While a smartphone is depicted, in some embodiments a trigger may be received, or an alert provided, via other terminals as well as long as they have the accept to receiving an incoming communication. For example, a laptop computer, mobile computer, police radio system, police radio set, or other terminal may be used.

Figure 2:
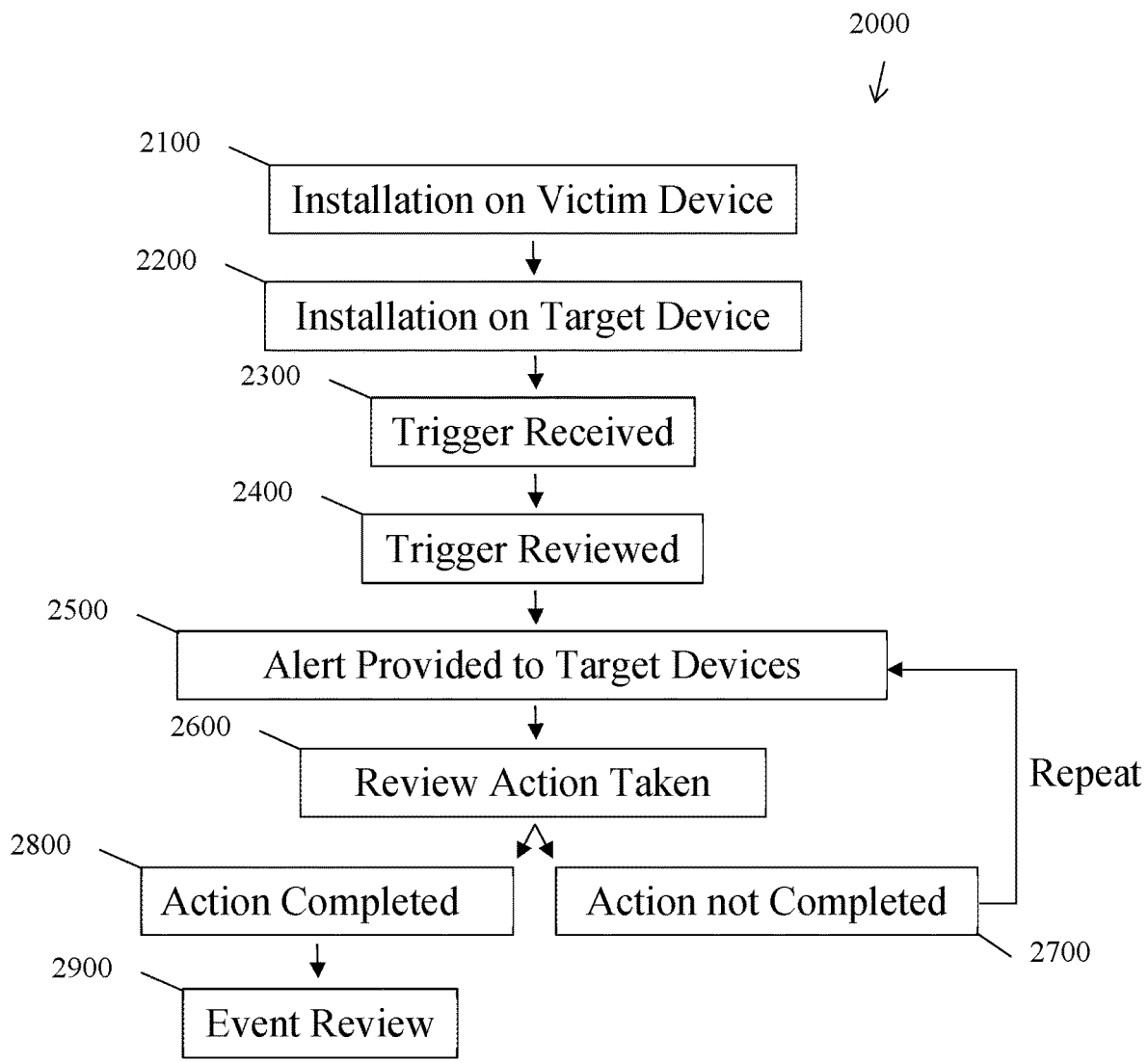
FIG. 2 is a flow diagram of a process, according to an embodiment.

FIG. 2 is a flow chart of the process of an embodiment. Flow chart 2000 begins with a victim user installing a network-based alert software application on their mobile communication device such as a smartphone at step 2100. When installing the application at step 2100, the victim user is prompted to give the application access to inputs such as microphones and cameras, although the victim user is permitted to limit the application's access should they choose to do so.

The victim user is also prompted at step 2100 to set default arrangements. The victim user is asked at step 2100 what sort of alert should be sent and to whom if the application detects a trigger but is unable to determine the type of emergency or obtain details about the emergency from the victim user. The victim user is also asked to match up different types of emergencies with different types of target users. For example, the victim user may set a default arrangement so that if the application only receives a generic trigger such as the phrase "I need a hero", "hero app" or the press of a trigger button, the alert is sent out to all nearby users of the application and also sent to emergency services in the area either by being sent to dedicated emergency networks or by being set to related application such as OnStar™. In another example, the victim may choose a setting so that if the emergency is determined to be a medical emergency, the alert is only sent to nearby users and to medical emergency services rather than also being sent to police or fire services. A set of initial settings is also provided at step 2100, and the victim user is permitted to simply confirm the initial settings rather than setting everything personally.

At step 2200 one or more target users install the network-based alert software application on their mobile communication device(s). At step 2200 the target users are asked to permit the software application to access outputs, such as a speaker, light, or display so that if an alert is received their mobile devices will be able to notify them of the information transmitted to their mobile devices. Like the victim user, the target users will be asked to set or confirm initial settings. Target users are asked which types of alerts they wish to receive, whether there are times they will not be available to receive an alert, and how much information about them is to be provided to other users of the application. For example, a target user may be asked to provide their name and other information. In some embodiments, information about target and victim users may be collected to promote accountability and prevent misuse of the application.

In some embodiments, target users or certain types of target users are always required to be available in order to prevent gaps in network coverage. In some embodiments, there are classes of target users, such as volunteer users and professional users, each class of target user having its own set of setting options. For example, a police service may join as a professional user.

It is to be understood that in some embodiments, each user of a network-based alert software application is both a victim user and a target user. In some embodiments, each user or member has access to the application to both provide a trigger and to receive an alert.

At step 2300 the victim user provides a trigger to the network-based alert software application through their mobile communication device. A trigger may be provided in a variety of ways. For example, a user may choose to be able to provide an audible trigger by accessing a virtual assistant by voice command or by stating the phrase "I need a hero", or similar. As another example, a user may choose to have a 'trigger' icon on a home screen of their device, so that they may send a trigger by toggling the 'trigger' icon. As another example, a user may choose to access an application interface to find a trigger icon or may access the application interface to provide a more detailed trigger setting out the type of emergency, what is to be included in an alert, and to whom the alert is to be sent. In some embodiments, a user may have the option of adding a variety of 'trigger' icons to a home screen or allow a virtual assistant to receive a variety of audible phrases, each for a different type of alert or set of alert settings.

At step 2400 the trigger is reviewed. In cases where the trigger is provided with details, the trigger review may consist only of ensuring it comes from an authorized user, such as a user whose account is not restricted due to misuse. In cases where the trigger is not provided with details, a review may involve artificial intelligence, default settings, human input, or some combination of the above. For example, a victim user may have set the application so that a generic trigger results in the application accessing a camera and microphone to receive audio and video to the extent possible, the audio and video being parsed or otherwise reviewed for clues as to the type of emergency. In this example, if a trigger is received and the audio input includes mention of a weapon, the emergency may be determined to be a violent crime. In some embodiments, a review of an alert is a high-level review so as to not delay the issuance of an alert, or is an ongoing process after an alert is issued.

At step 2500 an alert is sent out to network-connected target communication devices. The network-connected target communication devices that receive the alert will depend on the settings governing the alert. The type of alert will also depend on the settings governing the alert. For example, if a target user has requested that an alert be only a flashing light, that target user will not receive an audible or visible alert and will have to access an application interface to obtain details about the alert. In another example, a victim user may have set the application to only send out basic information, such as that there is an emergency and a location.

Locations are of importance, as target users must know where to respond. Further, in many cases nearby volunteer target users may be able to render assistance much more quickly then professionals such as professional users. Still further, in some cases an emergency may not be the type of emergency which requires the assistance of professionals, for example an emergency may be an elderly user's need for assistance in climbing stairs.

GPS-determined location, radio technology-determined locations, or otherwise-determined locations may be used. In some embodiments, a victim user device may assist in location determination, such as by sending out a radio pulse or audible pulse to help guide responders who are nearby to a more exact location then is available otherwise.

An alert provided at step 2500 may also be a more detailed alert. For example, it may contain a video clip received from a camera of a network-connected victim communication device, such as a five-second clip to help a target user determine the nature of the emergency. In this example, a video clip may be sent periodically to give the target user glimpses of the events without bogging down a network or a target user with data the way a continuous stream may. Although in some embodiments, a continuous video stream may be provided. Video, audio, and location information are among the types of information that could be provided as part of an alert.

At step 2600 the action taken is reviewed. A review is used to determine whether the emergency has been addressed and has been dealt with. Particularly were an alert is sent periodically or continuously, it is important to determine when to stop sending the alert. A review may include information received from target users concerning whether they are responding, information from the victim user about whether their emergency has been addressed, or information from professional emergency services about what has been done.

At step 2700, if it is determined that the emergency is not dealt with, the alert continues. At step 2800, if it is determined that the emergency is dealt with, the alert is ended.

At step 2900, the event is reviewed, and an update is provided to victim and target users. For example, the victim user may be provided with information about who responded and when, the target users may be provided with information about what happened and how the emergency was addressed. Event reviews may also include updates about any issues encountered, such as updates sent to administrators or to emergency services.

While the process of FIG. 2 has been described with reference to locally-available settings and processing, in some embodiments network-connected victim communication devices or network-connected target communication devices or both may use internet or cloud-based storage or processing.

Figure 3A:
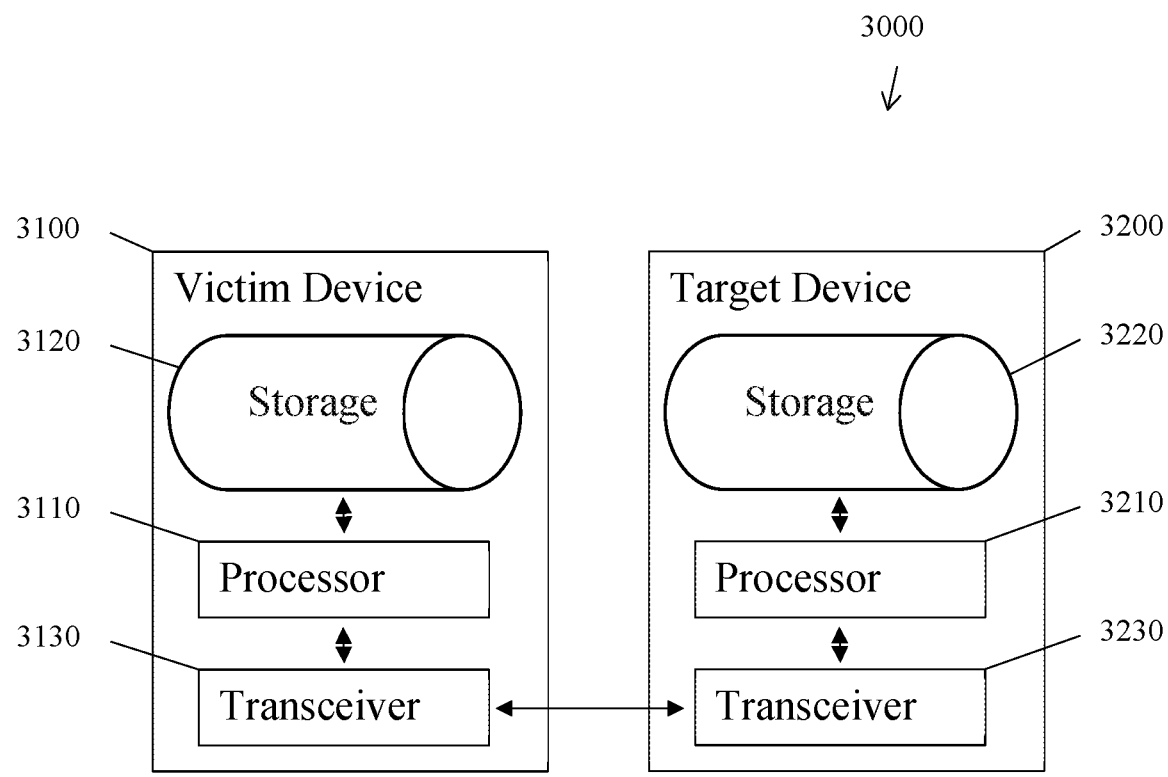
FIG. 3A is a schematic diagram of a system, according to an embodiment.

In some embodiments, such as depicted in FIG. 3A a system is employed. System 3000 includes a network-connected victim communication device 3100 having at least one processor 3110 and at least one memory or storage 3120. Network-connected victim communication device 3100 also has at least one network connection device 3130, such as a radio transceiver or other connection device.

System 3000 also includes at least one network-connected target communication device 3200, which also has at least one processor 3210, at least one storage 3220, and at least one network connection device 3230. Network-connected victim communication device 3100 and network-connected target communication device 3200 communicate directly via radio transceivers or transmitters and receivers. However, in some embodiments, indirect connections such as via satellite or cellular networks or other local or wide area networks are used.

In some embodiments, a system such as system 3000 has restrictions on the manipulation of a network-connected victim communication device while an alert is being broadcast. For example, in some embodiments, if an alert is triggered by network-connected victim communication device 3100, network-connected victim communication device 3100 may be automatically configured to no longer accept a command to shut down. In some embodiments, if a user attempts to shut down or limit the broadcasting ability of a network-connected victim communication device which is the subject of an ongoing alert, the user is presented with a confirmation screen reminding the user of the ongoing alert and asking for confirmation of the proposed activity. In some embodiments, a network-connected victim communication device may be configured to, upon receiving a shut down command or other broadcast-limiting command, directly enter a limited operations mode (or "possum" mode) in which it appears to a user who is holding the device that the device is shut off while in fact the device continues to provide location data, video data, audio data or related data to be used in ongoing alerts sent to a network. In some embodiments, once a trigger has been received the ongoing alert may only be cancelled by the network-connected victim communication device if a passcode is entered or a fingerprint scan or other security standard is met, such as a facial scan. In some embodiments, once a trigger has been received and an ongoing alert has begun the alert can only be ended by accessing the application on the network-connected victim communication device to turn off the alert, or, in some embodiments, by administrator intervention into the system.

Figure 3B:
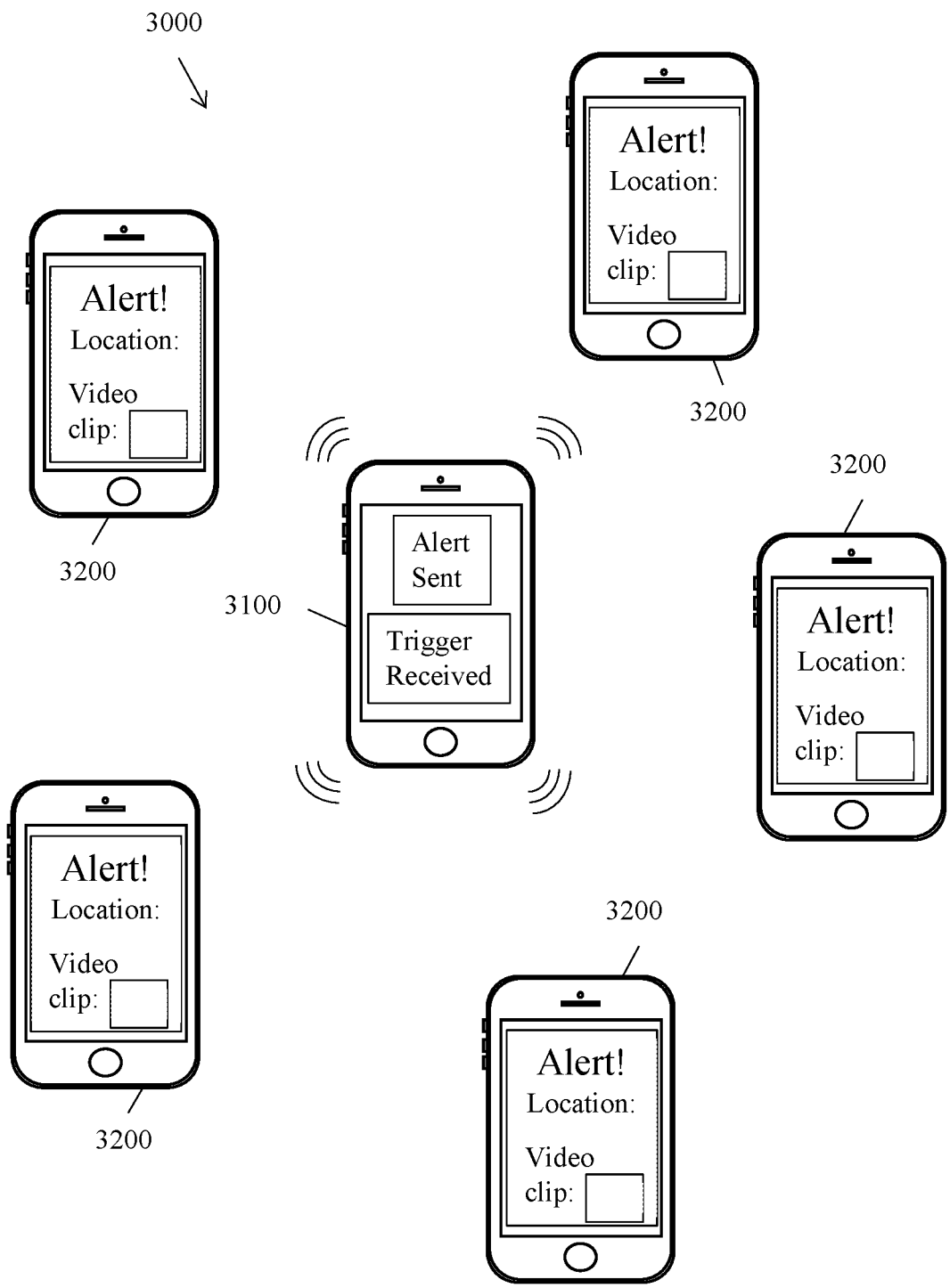
FIG. 3B is a schematic diagram of a system, according to an embodiment.

In the embodiment of FIG. 3B, when a trigger is received, a network-connected victim communication device 3100 sends location and video data for use in sending alerts to nearby network-connected target communication devices 3200.

Figure 4:
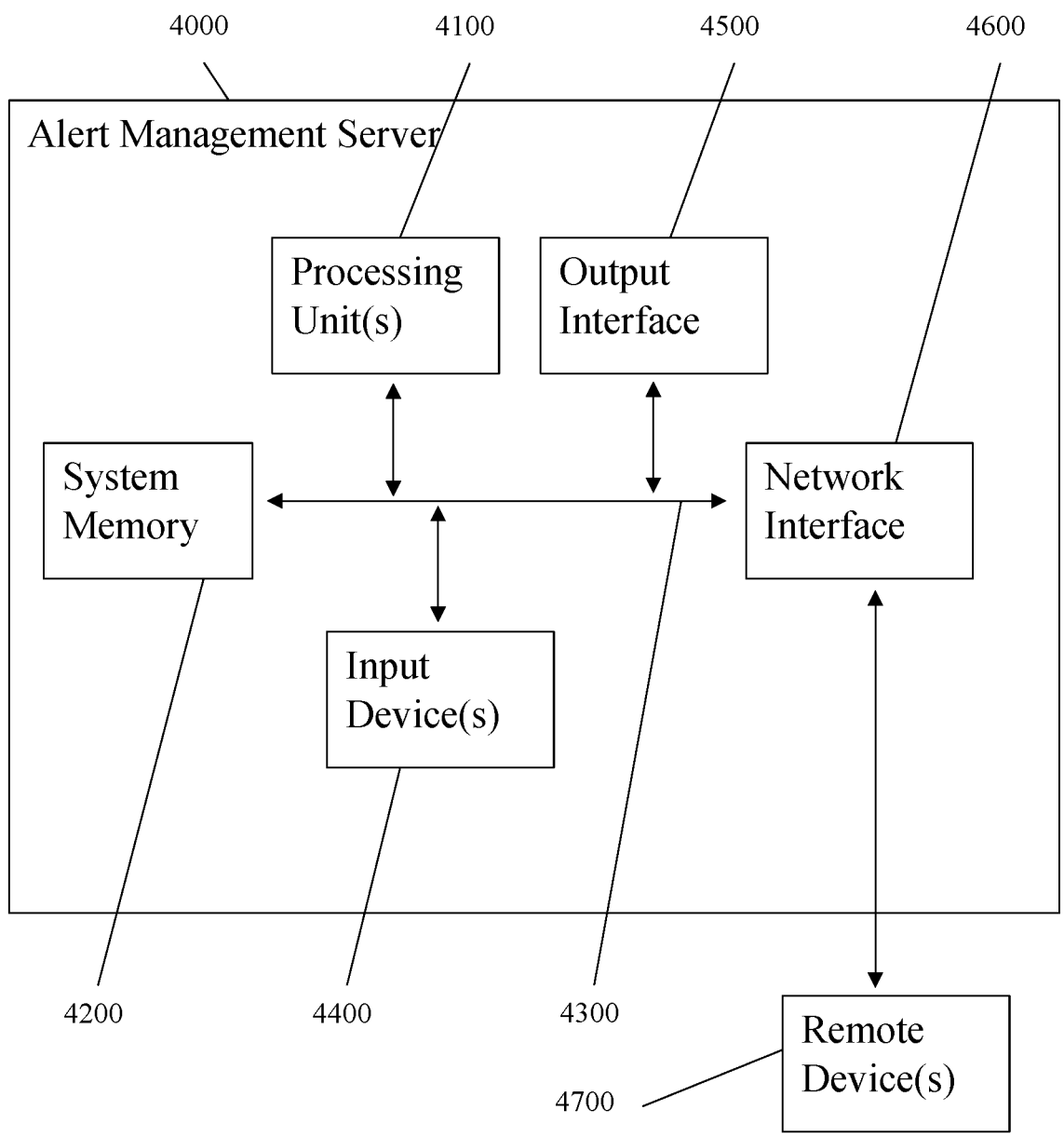
FIG. 4 is a schematic diagram of a computer system, for use with an embodiment.

Embodiments of the present invention may be implemented using devices, such as the computer system depicted in FIG. 4. The alert management server 4000 executes computer instructions to perform steps involved in receiving triggers, gathering inputs, processing inputs, sending alerts, and other processing related to embodiments of the present invention.

As depicted in FIG. 4, alert management server 4000 includes a processing unit 4100 and a system memory 4200 which may be interconnected across a system bus or network 4300. The alert management server 4000 has access to computer readable media, and the system memory 4200 may include computer readable storage media in the form of volatile and/or non-volatile memory such as read only memory and/or random-access memory. In some embodiments system memory may include an operating system, application programs, and program data.

A user using the alert management server 4000 may interface with the computer through input devices 4400, such as a mouse or keyboard, to provide information and instructions. A user may receive information from the system from output devices, such as a monitor or network or output interface 4500, to receive presentations or media files or items or content. In some embodiments an alert management server may be networked and operable as a distributed system via network interface 4600, an alert management server 4000 may also be able to access distributed databases or other remote devices 4700 for information or processing capability.

Various embodiments of the invention have been described in detail. Since changes in and or additions to the above-described best mode may be made without departing from the nature, spirit or scope of the invention, the invention is not to be limited to those details but only by the appended claims.

What is claimed is:

1. A system for propagating an alert, comprising:
   a network-connected victim communication device comprising a processor, a memory, an input device and a transmitter configured to receive a trigger from a victim user;
   at least one network-connected target communication device comprising a processor, a memory and a receiver configured to receive an alert and to provide a notification of the alert to a target user; and
   an alert management server communicatively coupled over a network to the network-connected victim communication device and to the at least one network-connected target communication device and configured to receive the trigger from the network-connected victim communication device and to provide the alert to the at least one network-connected target communication device, the alert management server configured to monitor the network-connected victim communication device for the trigger, receive the trigger from the network-connected victim communication device, the trigger being an audible phrase captured by the network-connected victim communication device as an audio clip with the alert management server being configured to parse the audio clip and extract an emergency-identifying criterion based upon the audible phrase being different for each different type of alert, create the alert based on the trigger, and send the alert to the at least one network-connected target communication device.

2. The system of claim 1, wherein a Global Positioning System (GPS) based location is sent when the network-connected victim communication device receives the trigger.

3. The system of claim 2, wherein the alert includes a network-connected victim communication device location indicator.

4. The system of claim 2, wherein the alert includes a map showing a network-connected victim communication device location.

5. The system of claim 1, wherein the network-connected victim communication device comprises an installed application connecting application users to a network-based alert community.

6. The system of claim 1, wherein the network-connected victim communication device cannot be shut down after the trigger is received until a cancellation is received, the cancellation being at least one of a passcode and a facial scan.

* * * * *